Figure 3:
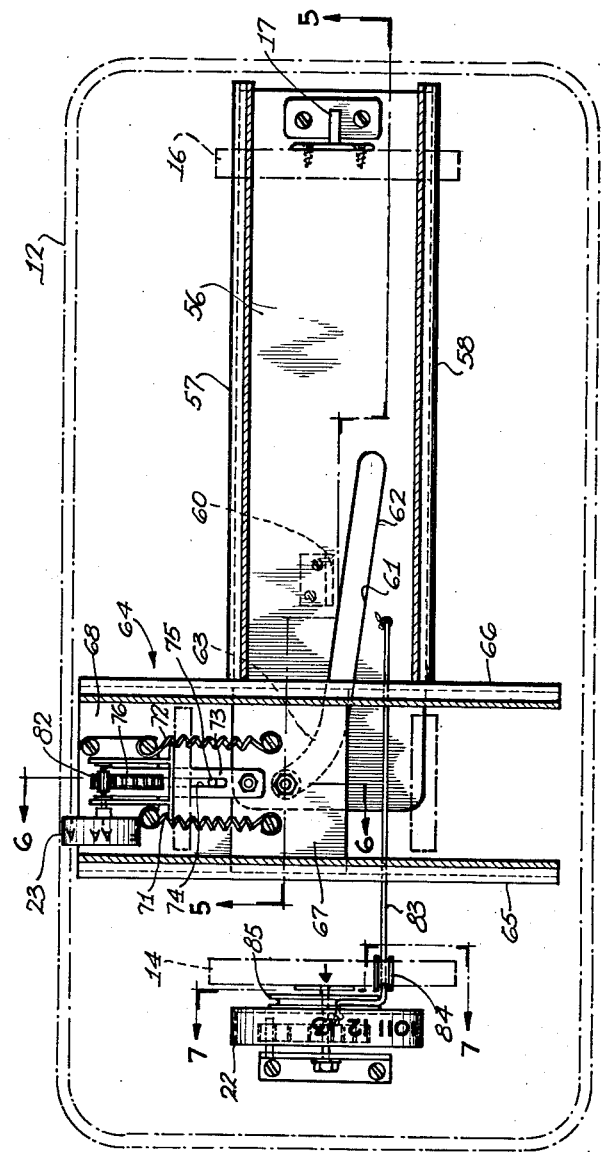

March 31, 1964     T. O. FOURNIER     3,126,634
FOOT MEASURING DEVICE
Filed July 9, 1962                                                        3 Sheets-Sheet 1
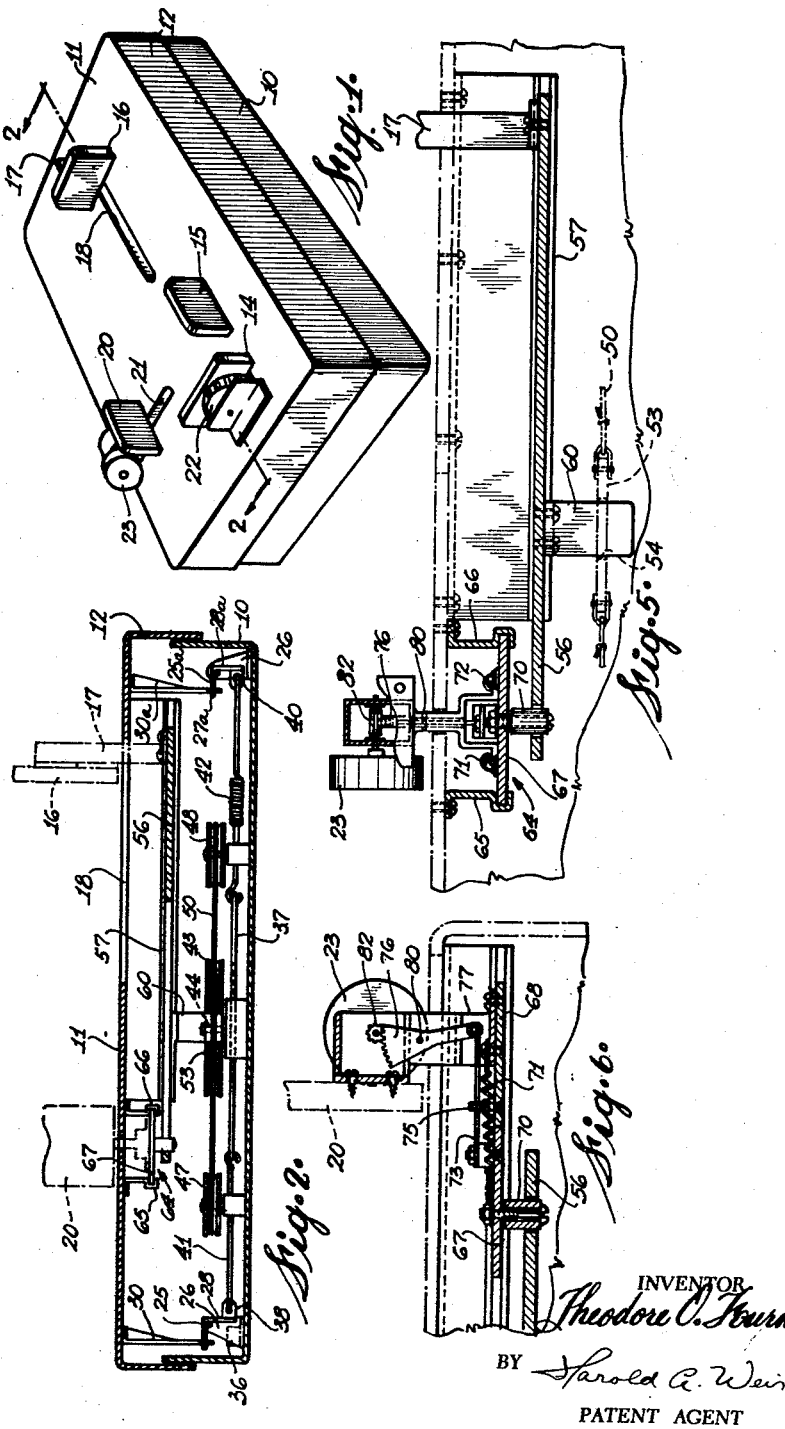
INVENTOR
Theodore O. Fournier
BY Harold A. Weis
PATENT AGENT March 31, 1964

T. O. FOURNIER 3,126,634

FOOT MEASURING DEVICE

Filed July 9, 1962

3 Sheets-Sheet 2

INVENTOR
Theodore O. Fournier
BY Harold P. Weir

PATENT AGENT

March 31, 1964 T. O. FOURNIER 3,126,634
FOOT MEASURING DEVICE
Filed July 9, 1962 3 Sheets-Sheet 3
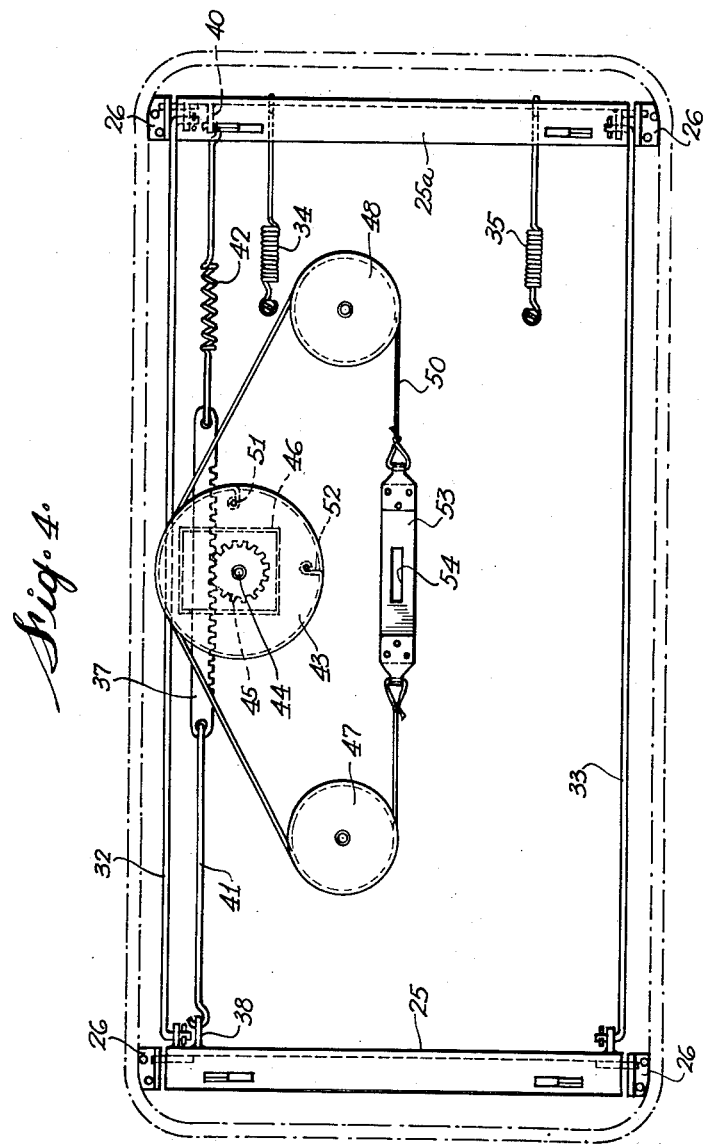
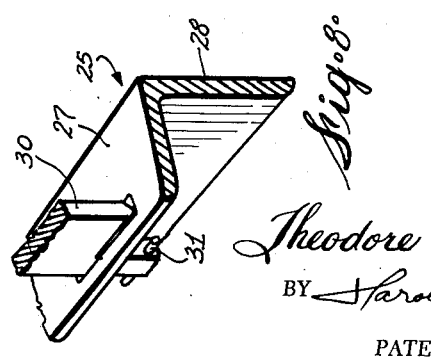
INVENTOR
Theodore O. Fournier
BY Harold G. Weir
PATENT AGENT

United States Patent Office 3,126,634
Patented Mar. 31, 1964

3,126,634
FOOT MEASURING DEVICE
Theodore O. Fournier, 68 Lyndale Ave., Ottawa 3,
Ontario, Canada
Filed July 9, 1962, Ser. No. 208,317
4 Claims. (Cl. 33—3)

This invention relates to foot measuring devices, and in particular it relates to a device for measuring and registering length and width sizes of a foot automatically.

Many devices have been used in the past for measuring a foot to determine the proper length and width sizes for the fitting of boots or shoes. The majority of these prior devices were manually operated and required a certain degree of skill on the part of an operator. One type of manual prior art device comprised a base for receiving a foot to be measured and movable length and width blocks. The operator advanced the blocks manually until they pressed with a certain force against the foot and a pointer on the blocks indicated size on a scale beside the block. It will be apparent that to get a consistent and accurate indication of size, the force used by the operator should be within reasonable limits and should be consistent from measurement to measurement. Also, because width sizes are related to the foot length size as well as the actual width distance across the foot, the width size must be obtained from a chart. Thus, a certain skill is required by an operator.

A few prior art devices have attempted to overcome these difficulties by making the measurement partly automatic. In these devices the operator moved levers or slides which actuated a measuring mechanism to contact a foot being measured and the length and width sizes were registered on indicators. While these devices were an improvement over the manual devices, they still required an operator to make the measurement, that is to actuate the necessary levers or slides, and a certain amount of skill was still required. In addition, these prior machines were often complex in their construction or operation.

The present invention is an improvement on these devices, and it provides an automatic means for obtaining an indication of the length and width size of a foot. The foot to be measured is placed in position on the device and pressed downwards. No other action is required and hence the device is termed "automatic." The downward pressure of the foot actuates the device and the correct length and width sizes are displayed.

It is therefore an object of this invention to provide a device which will automatically and accurately measure and display both the length and width sizes of a foot.

It is another object of this invention to provide a device of novel construction for automatically measuring the length and width of a foot, for displaying the length size of the foot in accordance with the measured length and for displaying the width size of the foot in accordance with the measured length and width of the foot.

It is a further object of the invention to provide a device of novel construction for measuring length and width of a foot actuated only by pressure of the foot.

Figure 7:
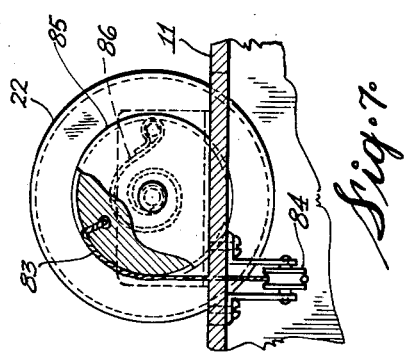

These and other objects of the invention will be apparent from the following description taken in conjunction with the accompanying drawings in which:

FIGURE 1 is a perspective overall view of a foot measuring device in accordance with one embodiment of the invention, FIGURE 2 is a sectional side view of the foot measuring device of FIGURE 1 taken along line 2—2 of FIGURE 1, FIGURE 3 is a sectional top view of the foot measuring device with the foot receiving platform removed, FIGURE 4 is a top view of the foot measuring device with the foot receiving platform and all parts fastened thereto removed, and showing the base with its associated parts, FIGURE 5 is a partial sectional side view showing the slides and the width indicator, taken along line 5—5 of FIGURE 3, FIGURE 6 is a partial sectional view of the width size indicator mechanism, taken along line 6—6 of FIGURE 3, FIGURE 7 is a partial sectional view of the length size indicator, taken along line 7—7 of FIGURE 3, and FIGURE 8 is a fragmentary isometric view of one of the bell crank levers and supports.

In the drawings parts have been omitted in various figures to simplify them. It is believed that a study of the figures as a whole clearly and accurately depict the foot measuring device in a preferred form.

Briefly, the present invention is for a foot measuring device comprising a base, a foot receiving platform mounted to the base for limited movement towards and away from the base, means biasing the platform away from the base, foot engageable blocks on the platform movable longitudinally and transversely in response to movement of the platform towards the base, and a length and a width size indicator actuated by movement of the blocks to indicate size.

Referring now to FIGURE 1 there is shown a base 10 and a foot receiving platform 11 mounted to the base for limited movement towards and away from the base 10. The platform 11 may conveniently have a skirt 12 extending away from the foot receiving surface of platform 11 and fitting slidably over sides of base 10. This serves to enclose the mechanism of the device while permitting the platform 11 to move up and down on base 10.

A toe block 14 and a side block 15 are fixed to the upper surface of platform 11. A heel block 16 is longitudinally spaced from toe block 14 and is substantially longitudinally aligned therewith. An arm 17 passing through a longitudinal slot 18 supports heel block 16 from the mechanism beneath platform 11 for slidable longitudinal movement towards and away from toe block 14. Similarly a side block 20 is supported by an arm (not shown in FIGURE 1) extending through a transverse slot 21 for transverse movement towards and away from the side block 15. When the device is not in use the movable blocks 16 and 20 are in their outward positions, that is, are farthest from the opposing fixed block, as shown. In the embodiment of FIGURE 1, a rotatable indicator wheel 22 is mounted outwardly of toe block 14 and has length size indicia thereon, and a rotatable indicator wheel 23 is mounted outwardly of side block 20 and is movable therewith and has width size indicia thereon.

It will be apparent that the toe block 14 could be of greater thickness and the indicator wheel 22 incorporated within the block 14 with a window provided in block 14 to make the length size indicia visible. Similarly, the indicator wheel 23 could be incorporated within the side block 20 and a window provided to make the width size indicia visible. It is contemplated that the width size indicator 23 could be made stationary, that is fastened to platform 11, rather than being mounted to movable side block 20, and this will be discussed hereinafter.

In the operation of the foot measuring device, the foot to be measured is placed on the foot receiving platform 11 with the toe just touching block 14 and the side of the foot just touching side block 15. Downward pressure is applied to the platform 11 which actuates the mechanism to advance heel block 16 and side block 20 until they contact the foot. The length and width sizes of the foot are then displayed on indicators 22 and 23 respectively. When pressure is removed from platform 11, the movable blocks 16 and 20 move outwards to their outermost positions. The foot that has been measured is removed and platform 11 is then clear for the placing and measuring of another foot.

The construction and arrangement of the operating mechanism is described with reference to the remaining drawings.

Two bell crank levers 25 and 25a are mounted to base 10 by brackets 26 at the ends thereof. These bell crank levers and their mountings can be seen in FIGURES 2 and 4, and a fragmentary view of one of the bell crank levers is given in FIGURE 8. The bell crank lever 25 is shown as having a substantially horizontal supporting arm 27 and a substantially vertical actuating arm 28. The lever 25a is similarly formed with a supporting arm 27a and an actuating arm 28a. Four extension members extend downward from platform 11 to engage the supporting arms 27 and 27a of bell crank levers 25 and 25a. Two of these extension arms 30 and 30a are seen in FIGURE 2. The extension arms are provided with a knife edge contact surface to reduce friction, and a suitable restraining means may be used to secure the extension arms 30 to the bell crank lever. A suitable restraining means, shown in FIGURE 8, requires the provision of a slot in the bell crank lever through which a portion of the extension arm 30, for example, passes, and a pin 31 for preventing removal.

Two tie arms 32 and 33 join the activating arms at the outer ends thereof of bell crank levers 25 and 25a to distribute the load and cause the bell crank levers to move in unison. Springs 34 and 35 are connected between actuating arm 28a of bell crank lever 25a and base 10 to bias the supporting arms 27 and 27a of the bell crank levers in an upwards direction (clockwise direction as seen in FIGURE 2). This, in turn biases the platform 11 in an upwards direction. One or more stops 36 (FIGURE 2) may be provided to limit the movement of the bell crank levers and thus limit the upward movement of platform 11. Other means may, of course, be used to limit platform movement.

As is best seen in FIGURES 2 and 4, a rack 37 is supported between mounts 38 and 40 from actuating arms 28 and 28a respectively by a connecting rod 41 and a spring 42. A primary pulley 43 is supported by a shaft 44 rotatably mounted to base 10. A toothed gear wheel 45 is also mounted on shaft 44 so that the pulley 43, shaft 44 and gear wheel 45 rotate as one. The teeth of gear wheel 45 engage the teeth of rack 37 so that longitudinal movement of rack 37 rotates pulley 43. The gear wheel 45 may be mounted in a housing 46 having slots to admit the rack 37 whereby the rack 37 is prevented from moving away from the engaging teeth of gear 45 under heavy load. Two secondary pulleys 47 and 48 are rotatably mounted to base 10, and a flexible line 50, such as a wire or chain or the like, encircles the three pulleys 43, 47 and 48. The line 50 is secured to pulley 43 at 51 and 52 to prevent slipping. A transfer bracket 53 is mounted to the line 51 between the pulleys 47 and 48 where the line extends in a longitudinal direction. The bracket 53 is provided with a slot 54 to receive a tongue as will be described hereinafter.

The preceding description relates largely to the lower part of the operating mechanism mounted, for the most part, to base 10. The operation of this part of the mechanism is quite straightforward. A downward pressure (i.e., towards the base 10) on platform 11 applies a force to bell crank levers 25 and 25a causing them to rotate against the forces applied by springs 34 and 35. This movement of the bell crank levers 25 and 25a moves rack 37 longitudinally to the right as seen in FIGURES 2 and 4 causing rotation of pulley 43. Pulley 43, as seen in FIGURE 4, rotates in a clockwise direction and moves line 50 and thus bracket 53 to the left. It will be seen that if bracket 53 is for any reason prevented from movement to the left and pressure is still applied to platform 11, then spring 42 extends permitting movement of the bell crank lever relative to the rack. When downward pressure is removed from platform 11, the springs 34 and 35 return the mechanism to its starting or original position.

The following part of the description relates to the upper part of the mechanism which is largely mounted to platform 11.

Referring now to FIGURES 2, 3 and 5, a longitudinal slide 56 is mounted for longitudinal slidable movement in spaced tracks 57 and 58 which are conveniently suspended from the lower surface of platform 11 on their side of slot 18. A tongue 60 projects downwards from the bottom of slide 56 through slot 54 in bracket 53. Thus, longitudinal movement of bracket 53 causes a longitudinal movement of slide 56. The tongue 60 is able to move vertically within slot 54 as slide 56 and platform 11 move vertically up and down in accordance with applied pressure on platform 11. In addition, the tongue and slot permit easy assembly of the upper and lower parts of the mechanism.

It will be apparent that an obvious alternate construction would be to fasten line 50 directly to tongue 60 or an equivalent member on slide 56. Because the vertical movement of the platform 11, and thus slide 56, are small during operation of the device, the direct connection of line 50 to slide 56 will cause errors of negligible magnitude.

Fixed to the slide 56 is a bracket carrying arm 17 and and heel block 16 as previously described. The arm 17 extends through longitudinal slot 18. The slide 56 has an oblique slot 61 having a straight major part 62 and a curved part 63. The straight part 62 of the slot 61 has a slope determined by the width measurement of the smallest last of each side as related to the length measurement of each size. This relationship will be discussed subsequently.

A transverse slide indicated at 64 is mounted for transverse slidable movement in spaced tracks 65 and 66. The transverse slide has two parts 67 and 68 which travel in the same tracks at a level or plane between platform 11 and slide 56. A cylindrical pin 70 is mounted to part 67 of the transverse slide projecting downwards and engaging oblique slot 61 on slide 56. Thus the part 67 is caused to move transversely when longitudinal slide 56 moves longitudinally.

The part 67 and part 68 of the transverse slide are biased together by springs 71 and 72 connected therebetween. A slotted member 73 is fastened to part 67 having a slot 74 positioned over part 68. A pin 75 on part 68 engages slot 74 to limit the separation of parts 67 and 68. The end of member 73 remote from part 67 is connected to an actuator 76 to actuate the width size indicator wheel. This is best seen in FIGURES 3, 5 and 6.

Referring to FIGURES 3, 5 and 6, a supporting arm 77 is secured to part 68 of the transverse slide, and this arm 64 projects upwards through transverse slot 21 (FIGURE 1) to support side block 20 and the width indicator wheel 23. The actuator 76 is pivotally mounted to arm 77 by a pin 80. The lower end of actuator 76 is pivotally connected to slotted member 73 and the upper end comprises a toothed gear section 81 whose teeth engage a gear 82 on a common shaft with rotatable indicator wheel 23. As the parts 67 and 68 are moved apart against springs 71 and 72, the member 73 causes the lower end of actuator 76 to keep a constant distance from part 67 thereby causing actuator 76 to pivot about pin 80. This pivotal movement causes rotation of gear 82 and width indicator wheel 23.

It will be apparent to those skilled in the art that the width size indicator 23 need not be mounted to part 68 of the transverse slide. It could be mounted in any desired position on platform 11. The relative motion between parts 67 and 68 actuates the width size indicator, and a flexible coupling could be used to transmit this relative movement to any desired position. The arrangement shown does not need such a flexible coupling and is therefore simpler. It is preferred for this reason.

The construction and connection for actuation of the length size indicator will now be described with reference to FIGURES 3 and 7. A flexible line 83, such as a wire, chain or cord, is fastened to longitudinal slide 56 and is carried over a pulley 84 and is then fastened to a pulley 85 which may be integrally made with indicator wheel 22 or mounted to a common shaft with wheel 22. A coiled spiral spring 86 biases the wheel 22 in a clockwise direction as seen in FIGURE 7. As the slide 56 moves inwards (to the left in FIGURE 3) the line 83 moves towards the take up pulley 85 and permits spring 86 to rotate the length indicator wheel 22 in a clockwise (as in FIGURE 7) direction.

It is believed that the operation of the foot measuring device should now be clear. In the normal position or at rest position the blocks 16 and 20 are at their outermost position. The curved part 63 of oblique slot 61 is provided to move the transverse slide 64 and the side block 20 outwards more rapidly as the slide 56 approaches its outward position. This is done to provide greater spacing between the side blocks 15 and 20 for easier placing of a foot prior to measurement.

The oblique slot 61 is proportioned so that as slide 56, with block 16, advances to successively smaller length sizes, the transverse slide 64, with side block 20, is caused to move inwards with a spacing between the side blocks 15 and 20 equal to the smallest width size for each length size. Thus the width indicator 23 normally indicates the smallest width size. When the movable side block 20 contacts the side of a foot and is restrained, part 68 of transverse slide 64 is stopped and part 67 is moved further inwards rotating the width size indicator 23 until the movable heel block 16 contacts the heel of the foot stopping the mechanism. The correct width and length sizes are then displayed on indicators 23 and 22. If the foot being measured is a very wide foot, requiring a shoe width greater than is available in a shoe of correct length, then the width indicator 23 will reach its greatest width indication and parts 67 and 68 will reach their maximum separation before the heel block 16 contacts the heel of the foot. As parts 67 and 68 of transverse slide 64 reach their greatest separation, further separation is prevented by pin 75 engaging the end of slot 74, and this in turn prevents further movement of slide 56 with heel block 16. When this happens the length size displayed is the length size necessary to provide an adequate width for the foot being measured.

At the other extreme, if the foot being measured is a very narrow foot, the movable width block 20 will not contact the foot and the width size indicated will be the narrowest width available. The mechanism will stop, in this case, when block 16 contacts the heel of the foot and the required length size is indicated.

It will be noted that the mechanism is actuated from rack 37 which has a motivating force applied from the bell crank levers by spring 42. When the heel block 16 engages the heel of a foot stopping further movement, the spring 42 extends. The force with which heel block 16 engages the heel of the foot being measured is dependent on spring 42. The extension of spring 42 is a small part of its length and a suitable selection of spring 42 will provide a substantially constant force on the heel of a foot from measurement to measurement. Similarly, the force with which side block 20 engages the side of a foot is kept substantially constant by selection of springs 71 and 72.

It is believed that the foot measuring device described herein provides an improved means for measuring and indicating length and width sizes of a foot. The measurement is completed by a simple downward pressure of a foot and the device applies substantially constant measuring pressures to the actuating foot. The device is simple to operate and of relatively simple and reliable construction.

I claim:
1. In an automatic foot measuring device operable by downward pressure of a foot to indicate length and width sizes of the foot,
   a base,
   a foot receiving platform mounted to the base for limited vertical movement with respect to the base,
   said platform being provided with a longitudinally extending slot and a transversely extending slot,
   first spring means biasing said platform upwards,
   a first slide mounted for longitudinal slidable movement below said platform,
   said first slide being provided with an oblique slot,
   actuating means connecting the platform and the first slide moving said first slide longitudinally in response to vertical movement of said platform,
   a second slide comprising a first part and a second part mounted for transverse slidable movement in the same path below said platform,
   second spring means connected to said first and second parts biasing them together,
   a pin on the first part of the second slide engaging said oblique slot for transverse movement of said first part in response to longitudinal movement of said first slide,
   a first arm secured to the first slide projecting through said longitudinally extending slot,
   a heel block above the platform secured to said first arm for longitudinal movement with said first slide,
   a toe block fixed to the upper surface of the platform longitudinally spaced from the heel block and substantially longitudinally aligned therewith,
   a second arm secured to the second part of the second slide and projecting through said transversely extending slot,
   a first side block above the platform secured to said second arm for transverse movement with said second part,
   a second side block fixed to the upper surface of the platform transversely spaced from the first side block and substantially transversely aligned therewith,
   a length size indicator coupled to said first slide and indicating length size responsive to longitudinal movement of said first slide, and
   a width size indicator coupled to said first and second parts and indicating width size responsive to relative movement of said first and second parts.

2. In an automatic foot measuring device operated by downward pressure of a foot to indicate length and width sizes of the foot,
   a base,
   bell crank lever means mounted on the base having a substantially horizontal supporting arm and a substantially vertical actuating arm,
   a foot receiving platform supported by the supporting arm of the bell crank means and mounted to the base for limited vertical movement,
   a first spring connected between the actuating arm of the bell crank means and the base biasing the bell crank means in a direction to press the platform upwards,
   rack means connected to the actuating arm of the bell crank means and movable longitudinally in response to downward movement of the platform,
   a primary pulley rotatably mounted to the base having a shaft rotating with the pulley,
   a toothed wheel on the shaft of the primary pulley engaging the rack means and rotating in response to longitudinal movement of the rack means, at least one secondary pulley rotatably mounted to the base and coplanar with the primary pulley, a flexible line extending around the primary and secondary pulleys moving with rotation of the primary pulley, a portion of said line extending in a longitudinal direction, said platform being provided with a longitudinally extending slot and a transversely extending slot, longitudinally extending spaced tracks mounted below said platform to the underside thereof on either side of said longitudinally extending slot, a first slide mounted for longitudinal slidable movement in said longitudinally extending tracks, coupling means extending from the longitudinal portion of said line to said first slide for joint movement of said first slide with said line, transversely extending spaced tracks mounted below said platform to the underside thereof on either side of said transversely extending slot, said transversely extending tracks being in a plane between said longitudinally extending tracks and said platform, a second slide comprising a first part and a second part mounted for slidable transverse movement in said transversely extending tracks, a second spring connected to said first and second parts and biasing them together, said first slide being provided with an oblique slot, a pin on the first part of the second slide engaging said oblique slot for transverse movement of said first part with longitudinal movement of said first slide, a first arm secured to the first slide projecting through said longitudinally extending slot, a heel block above said platform secured to said first arm for longitudinal movement with said first slide, a toe block fixed to the platform on the upper surface thereof longitudinally spaced from the heel block and substantially longitudinally aligned therewith, a second arm secured to the second part of the second slide and projecting through said transversely extending slot, a first side block above said platform secured to said second arm and for transverse movement with said second part, a second side block fixed to the platform on the upper surface thereof transversely spaced from the first side block and substantially transversely aligned therewith, a length size indicator mounted on the platform indicating length size in accordance with the position of the heel block relative to the toe block, and a width size indicator mounted to said first side block indicating width size in accordance with the spacing of the second part and the first part of the second slide.

3. The automatic foot measuring device of claim 2 in which the rack means is connected to the bell crank means by a connection extensible in response to pressure over a predetermined level to permit movement of the bell crank means relative to the rack means.

4. The automatic foot measuring device of claim 2 in which the slope of the oblique slot is arranged for movement of the transverse slide to a position corresponding to the narrowest width size for each position of the longitudinal slide corresponding to a length size.

References Cited in the file of this patent

UNITED STATES PATENTS

| | | |
|---|---|---|
| 1,792,892 | Cobb et al. | Feb. 17, 1931 |
| 3,057,070 | Weil | Oct. 9, 1962 |